United States Patent [19]

Parker

[11] Patent Number: 5,408,779
[45] Date of Patent: Apr. 25, 1995

[54] AUTOMATIC FISHING DEVICE

[76] Inventor: M. Kay Parker, P.O. Box 293, Paris, Id. 83261

[21] Appl. No.: 229,669
[22] Filed: Apr. 19, 1994
[51] Int. Cl.⁶ .......................................... A01K 97/01
[52] U.S. Cl. ......................................................... 43/15
[58] Field of Search ............................. 43/15, 17, 21.2

[56] References Cited

U.S. PATENT DOCUMENTS

| | | |
|---|---|---|
| 2,177,912 | 5/1939 | Spitz et al. |
| 2,578,887 | 12/1951 | Jackson et al. ........................... 43/15 |
| 3,058,251 | 10/1962 | Brooks ..................................... 43/17 |
| 4,085,536 | 4/1978 | Wood, Jr. ................................. 43/15 |
| 4,219,955 | 9/1980 | Lo Bosco ................................. 43/15 |
| 5,025,584 | 6/1991 | Butterwick, Sr. ..................... 43/21.2 |
| 5,076,001 | 12/1991 | Coon et al. .............................. 43/15 |
| 5,249,387 | 10/1993 | Slocum et al. ....................... 43/17 X |

FOREIGN PATENT DOCUMENTS 267899A  5/1989  German Dem. Rep. .

Primary Examiner—P. Austin Bradley
Assistant Examiner—Jeanne M. Elpel
Attorney, Agent, or Firm—Richard Litman

[57] ABSTRACT

An automatic fishing device which includes a base member, a coiled spring in a vertical plane attached to the base, and a trip mechanism attached to an opposite end of the base. With a fishing rod secured within the coiled spring, the coiled spring is cocked and subsequently sprung by the action of a fish taking bait to hook the fish.

5 Claims, 5 Drawing Sheets

AUTOMATIC FISHING DEVICE

BACKGROUND OF THE INVENTION

1. FIELD OF THE INVENTION

The present invention relates to an automatic hook-fishing device.

2. DESCRIPTION OF THE PRIOR ART

Automatic fishing devices have been in common usage for many years. These devices typically set a fish in the mouth of a fish and notify the fisherman that a fish has taken the bait. Some of these devices may be used for fair weather, some my be used on a frozen lake, and others be used in both environments. Many of these devices are unduly complicated and consequently are infrequently used by fishermen.

U.S. Pat. No. 2,177,912, issued to Rudolph A. Spitz et al. on Oct. 31, 1939, discloses a Fishing Device which includes a rod holder in combination with a trip mechanism for maintaining a resilient rod in a bowed position when the line is baited and set for fishing, with the trip device releasable to cause a sudden snap movement of the bowed rod into the straight position and a consequent pulling of the fishing line for hooking a fish. This device, unlike the present invention, relies solely only on the resilient forces of the bowed rod to provide a sufficient snap movement to hook a fish.

U.S. Pat. No. 4,085,536, issued to Everett J. Wood, Jr. on Apr. 25, 1978, discloses an Automatic Fishing Device which includes a spring and a trigger mechanism connected to a support. The spring of this invention is not tubular and consequently cannot hold a conventional rod unless the rod has been modified for use with the invention.

U.S. Pat. No. 4,219,955, issued to Giuseppe Lo Bosco on Sep. 2, 1980, discloses an Automatic Hook-Fishing Device which includes a base plate, a pole holding rigid tubular member pivotally connected to the base, a tension spring attached to both the base and the tubular member which serves to bias one side of the tubular member, and a mechanism which serves to counterbias the tubular member. This invention lack the simplicity of the present invention and would therefore require a higher manufacturing cost than the present invention.

U.S. Pat. No. 5,025,584, issued to Gerry A. Butterwick Sr. on Jun. 25, 1991, discloses a Fish Rod Holder which includes a elongated rectangular cross-sectioned base with support members at each end for holding a fishing rod. This invention, however, lacks an automatic hooking feature.

U.S. Pat. No. 5,076,001, issued to Ronny D. Coon et al. on Dec. 31, 1991, discloses a Spring Loaded Fishing Pole Holder which includes a T-shaped support unit and a U-shaped spring member, formed from a length of spring steel rod, resting on the support member. The fishing device of this invention, however, is unduly complicated in comparison with the present invention and consequently would require a higher manufacturing cost.

East German Patent Document DD 267,899, dated May 17, 1989, discloses a fishing rod holder with an automatic striking device which includes a tension spring attached at one end to a soil spike and at the other end to a spring bearing on the rod holder. This invention is unduly complicated in comparison to the present invention.

None of the above inventions and patents, taken either singly or in combination, is seen to describe the instant invention as claimed.

SUMMARY OF THE INVENTION

The present invention includes a base member which carries a coiled spring. The coiled spring is attached to one end of the base and extends vertically from the base to terminate in a open end. The open end of the spring is dimensioned to accept the butt of a fishing rod. At the end opposite the coiled spring, the base also carries a set of L-shaped anchor bolts. In use, a fishing pole is secured in the spring and positioned to allow one of the eye hooks or guide lines of the rod to engage one of the L-shaped anchor bolts. The device is radially positioned from a ice fishing hole allowing the line and hook at the end of the rod to submerge. The action of a fish taking the bait causes the eye hook and L-shaped anchor bolts to disengaged. The coiled spring and the rod within snap back to set the hook in the fish.

The present invention provided a efficient straight forward device for hooking fish. While many spring loaded fishing devices require a separate rod holder and spring device, the present invention allows the use a single spring as both the holder and the spring mechanism. The simple design eliminates the need for unduly complex mechanical interaction and would consequently allow for inexpensive manufacture in comparison to other automatic fishing devices.

Accordingly, it is a principal object of the invention to provide an automatic spring loaded fishing device which combines the spring mechanism and the rod holder.

It is another object of the invention to provide a straight forward design which would allow for inexpensive manufacture and easy maintenance once purchased.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
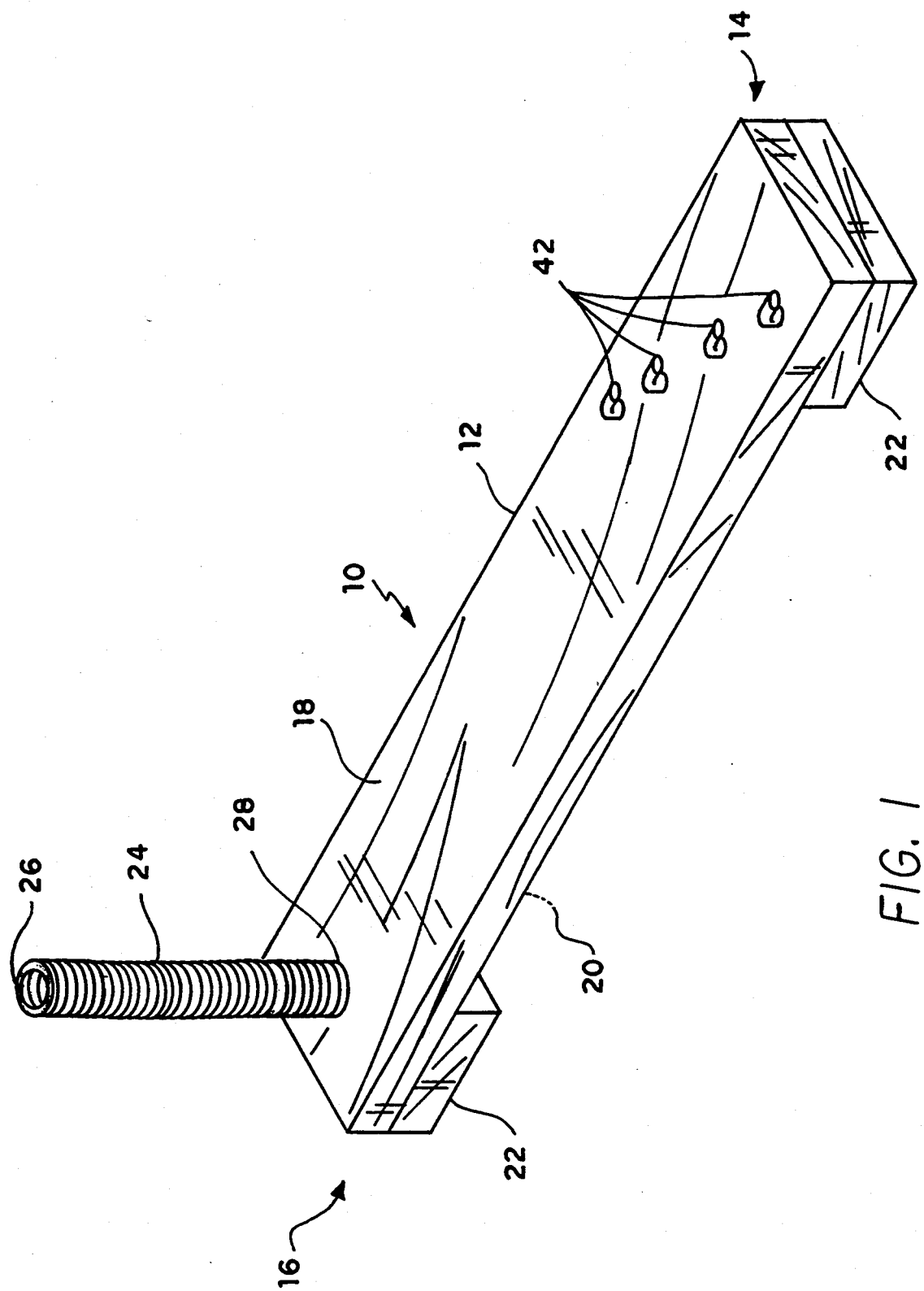
FIG. 1 is a perspective view of the automatic fishing device of the present invention.
Figure 2:
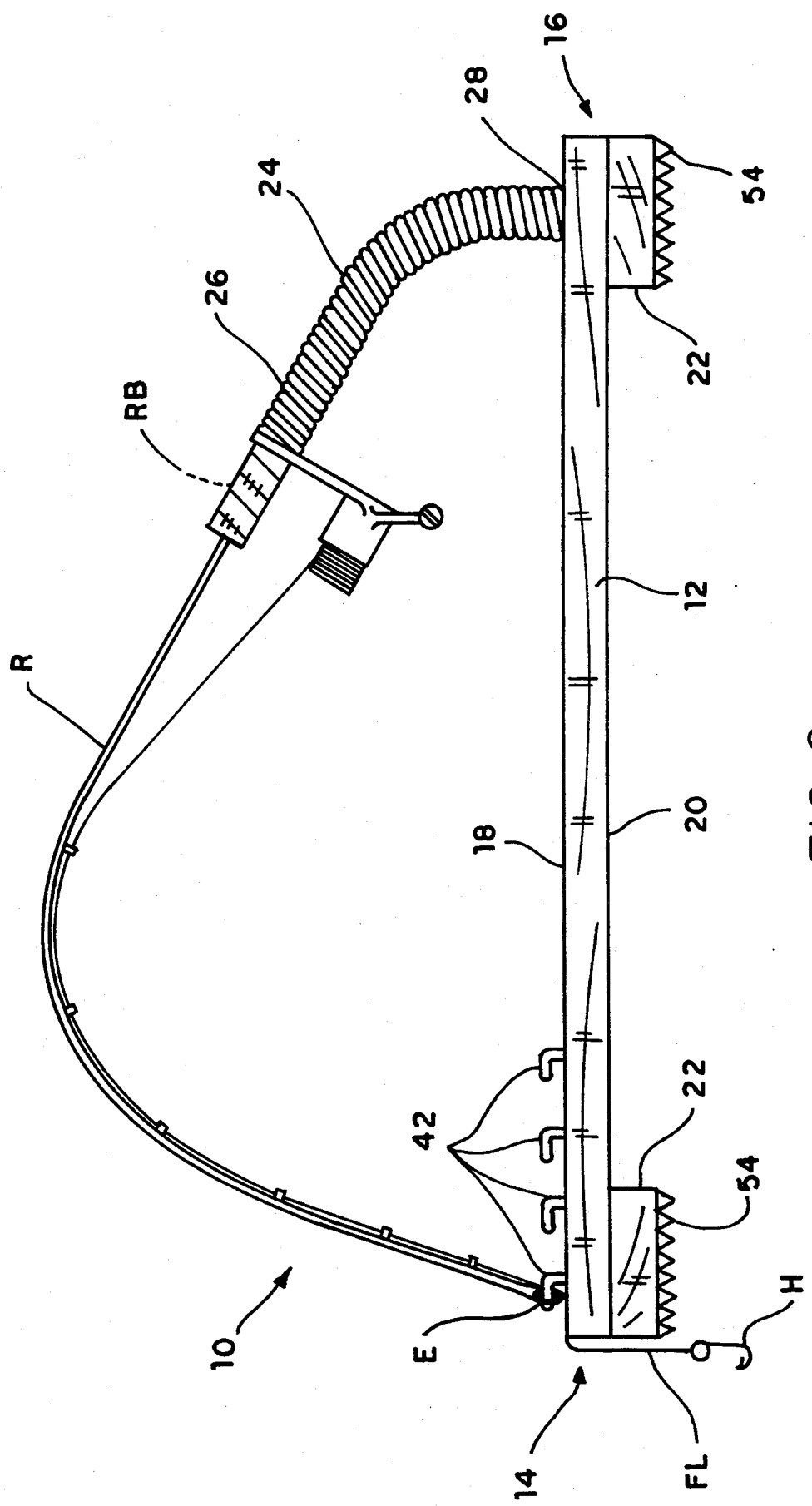
FIG. 2 is an environmental elevational view thereof showing a fishing pole with the invention in the cocked position.

As can be seen by reference to the drawings, and in particular to FIGS. 1 and 2, the automatic fishing device of the present invention is designated generally by the reference number 10. The device 10 includes a rectangular base 12, having a front end 14, a back end 16, a top surface 18, and a bottom surface 20. Blocks 22 are attached under the base 12 at both the front end 14 and the back end 16 to support the base 12 on the ice or on the ground.

Figure 4:
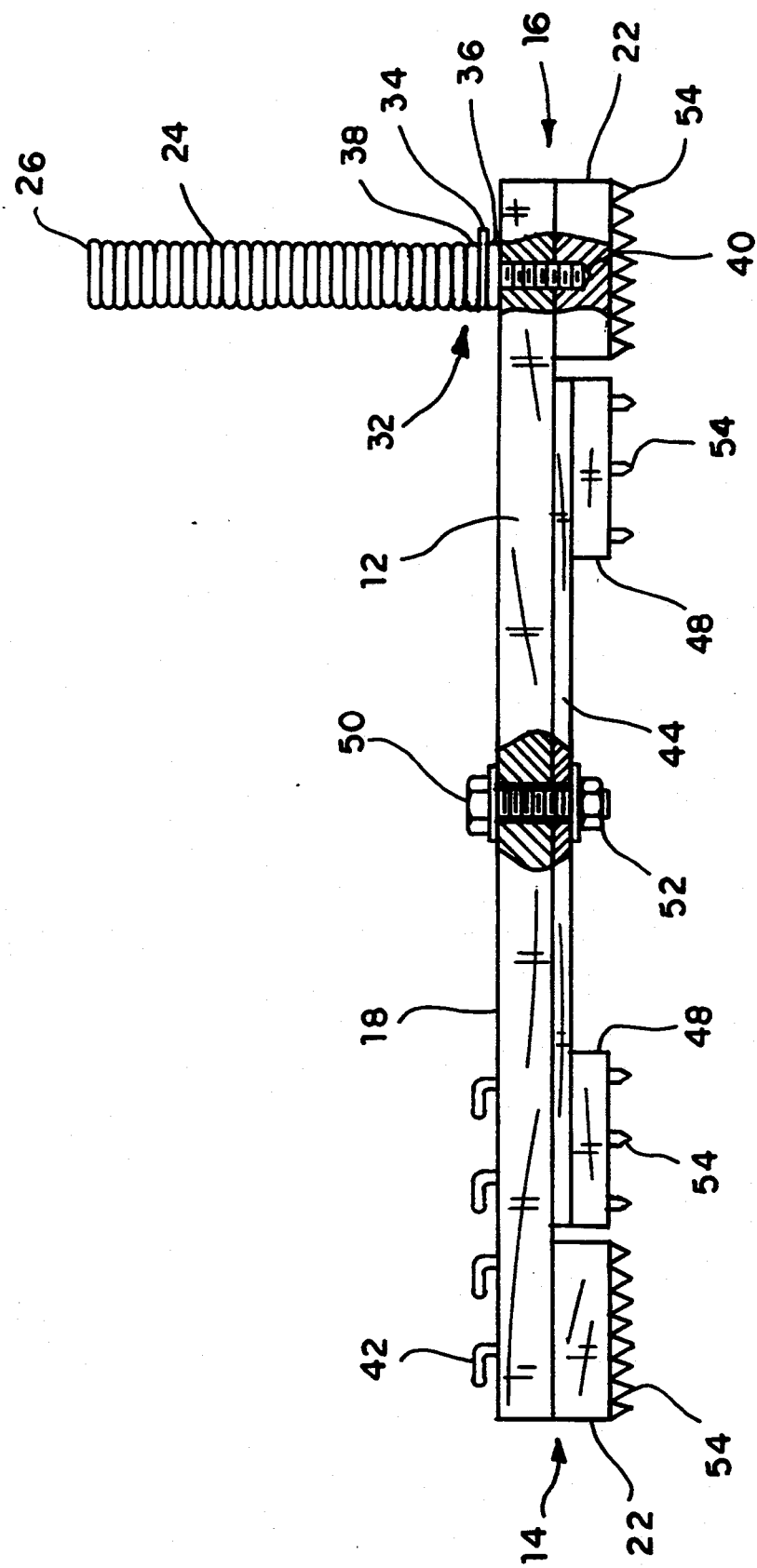
FIG. 4 is an elevational view thereof partially sectioned and showing the stabilizer arm in the retracted position.

A coiled spring 24 having a first end 26 and a second end 28 serves as the rod holder for the device 10. The coiled spring 24 is located in a vertical plane and dimensioned to accept the butt RB of a fishing rod R and support the fishing rod 30. As best shown in FIG. 4, the second end 28 of the coiled spring 24 is secured to the top surface 18 of the base 12 by first inserting the head 34 of a flat head bolt 32 between the first coil 36 and the second coil 38 of the spring 24 and then securing the stem 40 of the bolt 32 within the base 12.

A plurality of inverted L-shaped hook anchor bolts 42 are secured in the top surface 18 of the base 2 near the front end 14. The L-shaped hook anchor bolts 42 releasably engage a line guide or eye E of the fishing rod R. As shown in FIG. 2, when the rod R is placed within the spring 24 and the L-shaped anchor 42 engages the eye E, the spring 24 may be held in the bowed position.

Figure 3:
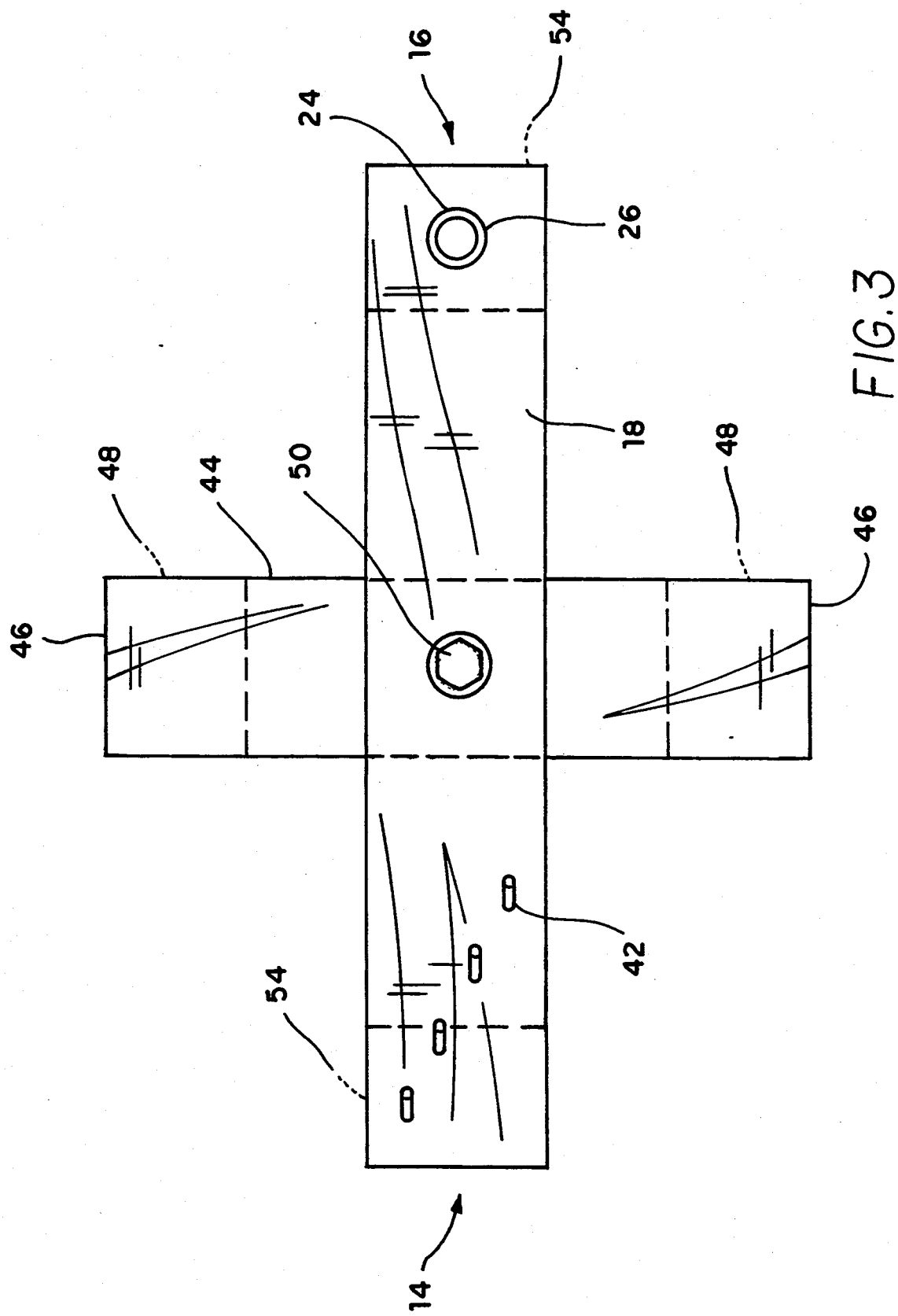
FIG. 3 is plan view of an alternative embodiment showing the stabilizer arm in the extended position.
Figure 5:
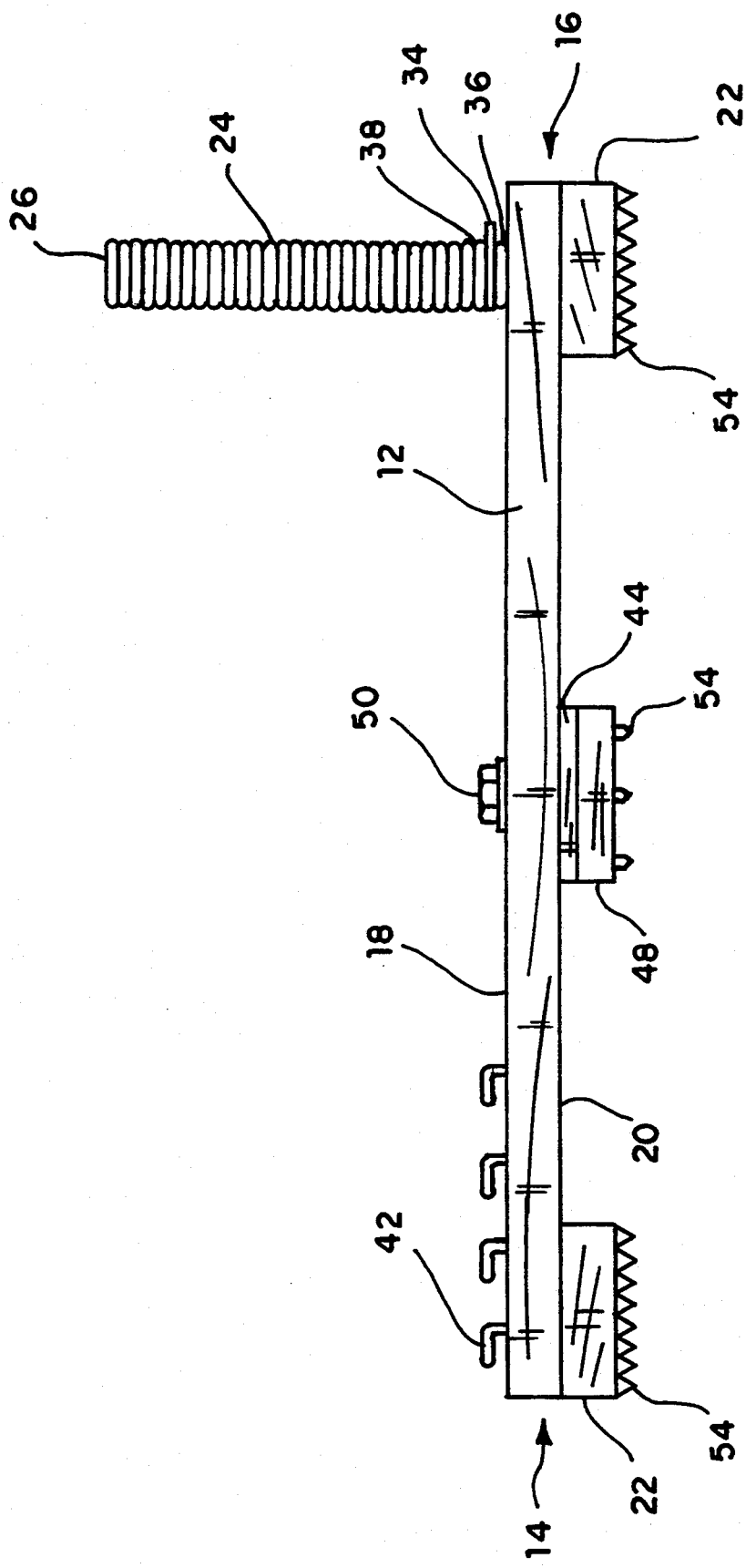
FIG. 5 is an elevational view thereof showing the stabilizer arm in the extended position.

As shown in FIG. 3, 4, and 5, a stabilizing swivel arm 44 may be added to the automatic fishing device 10. The stabilizing swivel arm 44 includes opposing end portions 46 with support legs 48 attached to each of the end portions 46. The stabilizing swivel arm 44 is pivotally connected to the base 12 by a bolt 50 and nut 52. Sufficient clearance is provided between the end portions 46 and support blocks 22 of the base 12 to allow the swivel arm 44 to rotate 360 degrees. As shown in FIG. 3 and 5, the arm 44 may be extended when in use to increase the stability of the device 10. When not in use, the arm 44 my be retracted and positioned under the base 12 for convenient transport as shown in FIG. 4. Spikes 54 may be added to the bottom of the support blocks 22 and the support legs 48 to secure the device 10 to the ice or ground.

The base 2 of the device 10 may be constructed of wood approximately 1" thick, 4" wide, and 21" long. The blocks 22, also made of wood, are each 1" thick, 4" wide, and 3" long. The spring 24, of the type typically used for garage doors, has a diameter of 1" inch and is approximately 8" inches in height.

In use, the fishing device is positioned radially from a ice fishing hole with the front end 14 at the edge of the hole. A ice fishing rod R having a length of approximately 24" to 30" is placed within the spring 24 and positioned to allow one of the L-shaped anchor bolts 42 to engage an eye E and bow the spring 24 to a cocked position. The fishing line FL hangs from the end of the rod R and into the water (not shown). A slight pull on the line FL disengages the eye E from the L-shaped anchor 42 and the resiliency of the spring 24 causes the rod R to spring back and set the hook H.

It is to be understood that the present invention is not limited to the sole embodiment described above, but encompasses any and all embodiments within the scope of the following claims.

I claim:

1. An automatic fishing device for use with a fishing rod comprising:
    a base, said base having a front end, a back end, a top surface, a bottom surface, and a plurality of support members attached to said bottom surface of said base;
    a resilient tubular rod holder located in a vertical plane, said tubular rod holder having a first end and a second end, said first end dimensioned to accept a butt of the fishing rod whereby the fishing rod may be secured within and supported by said tubular rod holder;
    securing means for securing said second end of said tubular rod holder to said top surface of said base at said rear end; and
    a trip device attached to said top surface of said base at said front end, said trip device releasably engageable with an eye of the fishing rod, whereby when the rod is placed in said rod holder and said trip device engages the eye of the fishing rod, said tubular rod holder may be held in the bowed position against the resiliency thereof.

2. The automatic fishing device for use with a fishing rod according to claim 1, wherein said trip device includes at least one inverted L-shaped hook anchor bolt attached to said top surface of said base at said front end.

3. The automatic fishing device for use with a fishing rod according to claim 1, wherein
    said resilient tubular rod holder is a coiled metal spring having a spring first end and a spring second end, and
    said securing means is a flat head bolt having a flat head portion and a stem portion whereby said flat head portion is inserted between a first coil and an adjacent second coil of said coiled metal spring and said stem is secured within said base.

4. The automatic fishing device for use with a fishing rod according to claim 1, wherein said plurality of support members attached to said bottom surface of said base includes
    a first support block affixed to said bottom of said base member at said front end,
    a second support block affixed to said bottom surface of said base at said back end, said second support block having means for securing said second support block to an underlying surface on which said base rests, and
    a stabilizing swivel arm having a arm first end, an opposing arm second end, a swivel point between said arm first end and said arm second end, a first swivel support leg attached to said arm first end, a second swivel support leg attached to said arm second end, and means for pivotally connecting said swivel arm at said swivel point to said bottom surface of said base between said front end and said back end of said base.

5. An automatic fishing device for use with a fishing rod comprising:
    a elongated rectangular cross-sectioned base, said base having a base front end, a base back end, a top surface, and a bottom surface;
    a first support block affixed to said bottom surface of said base member at said base front end;
    a second support block affixed to said bottom surface of said base at said base back end, said second support block having means for securing said second support block to an underlying surface on which said base rests;
    a stabilizing swivel arm having a arm first end, an opposing arm second end, a swivel point between said arm first end and said arm second end, a first swivel support leg attached to said arm first end, a second swivel support leg attached to said arm second end, and means for pivotally connecting said swivel arm at said swivel point to said bottom surface of said base between said base front end and said base back end;

a length of coiled metal spring, located in a vertical plane, said coiled metal spring having a first spring end and a second spring end, said first spring end dimensioned to accept a butt of the fishing rod whereby the fishing rod may be secured within and supported by said coiled metal spring;

means for securing said second spring end of said coiled metal spring to said top surface of said base at said rear end; and an inverted L-shaped hook anchor bolt attached to said top surface of said base at said front end, said L-shaped hook anchor bolt releasably engageable with an eye of the fishing rod, whereby when the rod is placed in said rod holder and said L-shaped hook anchor bolt engages the eye of the fishing rod, said coiled metal spring may be held in the bowed position against the resiliency thereof.

* * * * *